United States Patent [19]

Shuttleworth et al.

[11] Patent Number: 4,472,169
[45] Date of Patent: Sep. 18, 1984

[54] MIXTURES OF AZO DYES FROM 2-AMINO-3-NITRO-5-ACYL THIOPHENES AND CERTAIN ANILINE COUPLERS

[75] Inventors: Leslie Shuttleworth, Ormskirk; Michael H. Kearns; Robert N. Gourley, both of Liverpool, all of England

[73] Assignee: Eastman Kodak Company, Rochester, N.Y.

[21] Appl. No.: 368,239

[22] Filed: Apr. 14, 1982

[51] Int. Cl.$^3$ ............... C09B 29/033; C09B 29/09; C09B 67/22; D06P 3/34
[52] U.S. Cl. ......................................... 8/639; 260/152
[58] Field of Search ........................... 260/152; 8/639

[56] References Cited

U.S. PATENT DOCUMENTS

| | | | |
|---|---|---|---|
| T964,005 | 11/1977 | Coates et al. | 8/639 |
| 2,805,218 | 9/1957 | Towne et al. | 260/152 |
| 3,232,693 | 2/1966 | Lange et al. | 8/639 |
| 3,342,803 | 9/1967 | Artz et al. | 8/639 X |
| 3,954,395 | 5/1976 | Leverenz | 8/639 |
| 3,955,919 | 5/1976 | Fujii et al. | 8/639 |
| 4,321,055 | 3/1982 | Hansen et al. | 8/639 |

FOREIGN PATENT DOCUMENTS 48-12046  4/1973  Japan ................................ 8/639

Primary Examiner—Floyd D. Higel
Attorney, Agent, or Firm—Donald W. Spurrell; Daniel B. Reece, III

[57] ABSTRACT

Disclosed are mixtures of dyes of the formula

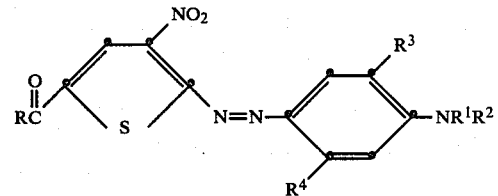

wherein R is alkyl of 1-4 carbons; $R^1$ is H or alkyl of 1-4 carbons; $R^2$ is alkyl of 1-7 carbons, or ethoxyethoxyethyl; $R^3$ is H or methoxy; and $R^4$ is H, methyl, or —NHCOCH$_3$. These mixtures exhibit improved properties such as reduced energy of application, for example, in the dyeing of polyester and cellulose diacetate or triacetate fibers and their blends with other synthetic and natural fibers.

3 Claims, No Drawings

MIXTURES OF AZO DYES FROM 2-AMINO-3-NITRO-5-ACYL THIOPHENES AND CERTAIN ANILINE COUPLERS

This invention concerns mixtures of dyes of the formula

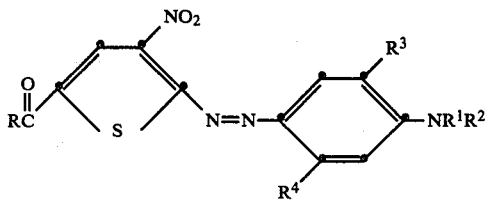

wherein R is alkyl of 1–4 carbons; $R^1$ is H or alkyl of 1–4 carbons; $R^2$ alkyl of 1–7 carbons, or ethoxyethoxyethyl; $R^3$ is H or methoxy; and $R^4$ is H, methyl, or —NHCOCH$_3$.

These mixtures exhibit improved properties, for example, in the dyeing of polyester and cellulose, diacetate or triacetate fibres and their blends with other synthetic and natural fibres.

The present dyes have been described in numerous patent disclosures such as U.S. Pat. No. 2,805,218 and German No. 2,818,101. A problem which has existed with many of these dyes is that they generally are temperature sensitive in their application to fibres, particularly polyester and cannot be satisfactorily applied at low temperatures. On the other hand, those dyes which do appear to have adequate application properties are in general the wrong shade which is of course a critical feature for commercial success of dyes of this type on polyester. This has been found to be exceptionally important with neutral blue dyes for polyester fibres which must meet very stringent shade, flare and brightness standards.

It has also been observed that these dyes in general have good light fastness and other general fastness properties, however, as aforesaid, the energy of application, i.e., sensitivity to the temperatures of dyeing, as well as crockfastness, and barre coverage are generally undesirable.

It has been discovered in accordance with the present invention that certain mixtures of dyes derived from 2-amino-3-nitro-5-acyl thiophenes surprisingly have much lower energy of application than the individual components. This enables dyes of the correct shade to be selected, and mixed, the energy levels of which individually would otherwise be unacceptable. Further, by selection of individual components of different shade but unacceptable energy level, a combination can be matched exactly to the shade required and the energy level simultaneously improved to an acceptable level.

The mixtures of two or more of the present dyes may be made by mixing the individual dyes or by mixing the required coupling components and adding thereto the diazotised 2-amino-3-nitro-5-acyl thiophene, thus preparing the mixture in situ. In general, the latter process may be more desirable for economic considerations and also for the fact that the mixture so prepared are intimate and homogeneous and indeed mixed crystals may even result upon precipitation. The amount of each dye can vary between about 1% and 99% by weight of the total dye weight, with from about 20% to about 80% of each dye being preferred.

Among the general advantages of the present invention are that the mixtures have lower dyeing energy levels and dyeings therewith show better crock fastness than the individual components, the use of mixtures allows the selection of the exact shade required which neither of the individual components have, and the mixtures allow a marginally acceptable fastness property of one component to be improved by ensuring that the second component is well above the acceptable level in this property. For example, one component may have marginal light fastness but have excellent pH stability and by ensuring that the second component has high lightfastness, some deficiency in the overall pH stability could be tolerated. Moreover, by selection of the appropriate components of a mixture, the economics can be improved, i.e., an expensive coupling component yielding high fastness dyes can be "diluted" with a less expensive coupling component giving a consequently lower cost final dyestuff.

EXAMPLE 1

Two dyes were prepared by normal diazotisation and coupling techniques having the above structure, where R is —CH$_3$ and the couplers have the formulas

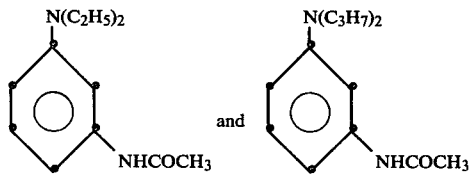

Each dye has a neutral-greenish blue shade and excellent technical properties on textured polyester except for temperature sensitivity and poor crock fastness when dyed at 115° C. as opposed to 130° C. as evidenced by a depth difference in the dyeing carried out at both temperatures. When the two dyes were mixed, 1/1 by weight, the shade and fastness properties remained as the single components but the temperature sensitivity as evidenced by the dyeings at 115° C. as opposed to 130° C. was much improved, showing no depth difference at the two temperatures. Also the crock fastness of the low temperature dyeing was excellent and equivalent to the high temperature dyeing.

EXAMPLE 2

As in Example 1, two dyes were prepared from N,N-diethyl-m-toluidine and N,N-diethyl-m-acetamidoaniline as the coupling components. In each case the energy level on polyester was high. Additionally, although both dyes were blue, the N,N-diethyl-m-toluidine dye (a) was much redder and brighter than the dye from N,N-diethyl-m-acetamido aniline (b), and further had inferior light fastness. A very desirable shade required by the trade is that given by the anthraquinone dye CI Disperse Blue 56, which is midway between the two dyes of this example and has very low energy of application. By mixing the two dyes a/b in the ratio of 3:2 a combination very close in shade to CI Disperse Blue 56 can be obtained having much improved energy of application over either of the individual components. Moreover, the light fastness of a and the economics of b are noticeably improved in the mixture.

EXAMPLE 3

Two dyes (a) and (c) were prepared where the coupling components comprised a 50:50 mixture of N,N-diethyl-m-toluidine and 2-methoxy-5-methyl-N-isobutyl aniline respectively. The dyes were similar in shade to CI Disperse Blue 56. The dye (a) had high energy as mentioned in Example 2, and the dye (c) was much lower in energy but did not have good pH stability. The mixture of dyes showed very similar shade and brightness to CI Disperse Blue 56 and was of low energy. The pH stability of dye (c) was improved and also its economics, while the energy level of dye (a) was much improved.

The invention has been described in detail with particular reference to preferred embodiments thereof, but it will be understood that variations and modifications can be effected within the spirit and scope of the invention.

I claim:

1. A mixture of two or more dyes of the formula

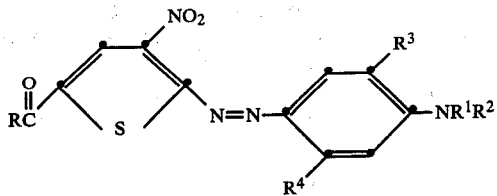

wherein: R is methyl; $R^1$ is H or alkyl of 1–4 carbons; $R^2$ is alkyl of 1–7 carbons; $R^3$ is H or methoxy; and $R^4$ is H, methyl, or —NHCOCH$_3$; the amount of each dye being between 1% and 99% by weight of the total dye weight.

2. A mixture according to claim 1 wherein each dye is present in at least about 20% by weight of the total mixture weight.

3. A mixture according to claim 2 wherein $R^3$ is —H or —OCH$_3$; $R^4$ is —H or —NHCOCH$_3$; and $R^1$ and $R^2$ are each ethyl or propyl.

UNITED STATES PATENT AND TRADEMARK OFFICE
CERTIFICATE OF CORRECTION

PATENT NO. : 4,472,169

DATED : September 18, 1984

INVENTOR(S) : Leslie Shuttleworth et al

It is certified that error appears in the above—identified patent and that said Letters Patent is hereby corrected as shown below:

In the heading, after "[21] Appl. No.: 368,239" add the following lines:

[30]   Foreign Application Priority Data

Jan. 6, 1982 [GB] United Kingdom ...... 8200315

Signed and Sealed this

Ninth Day of April 1985

[SEAL]

Attest:

DONALD J. QUIGG

Attesting Officer   Acting Commissioner of Patents and Trademarks